July 12, 1960 O. B. SHERMAN 2,944,288
COMBINATION PLASTICIZER, EXTRUDER AND
INJECTION CYLINDER WITH RECIRCULATION
Filed Jan. 28, 1957 2 Sheets-Sheet 2
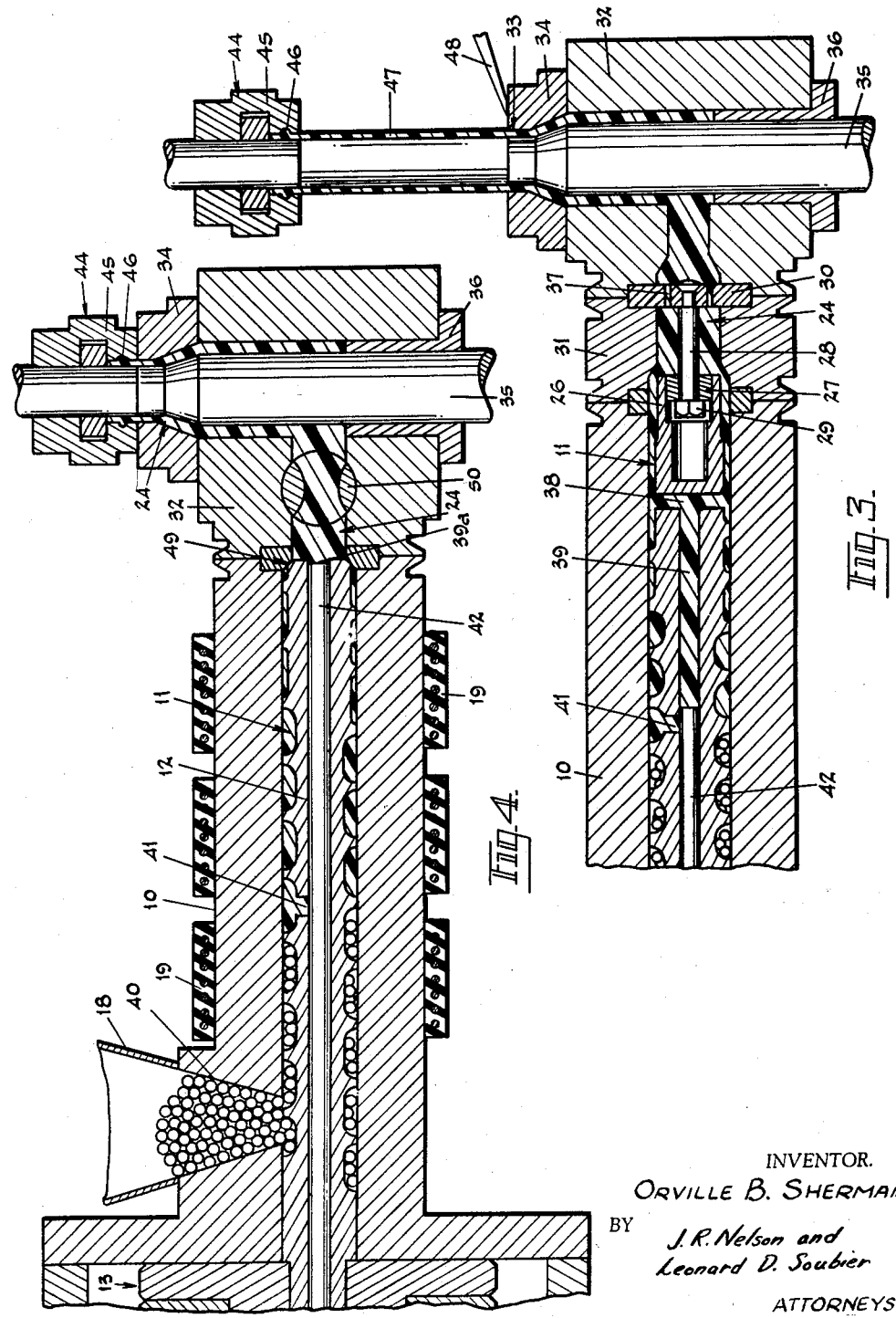
INVENTOR.
ORVILLE B. SHERMAN
BY J. R. Nelson and
Leonard D. Soubier
ATTORNEYS

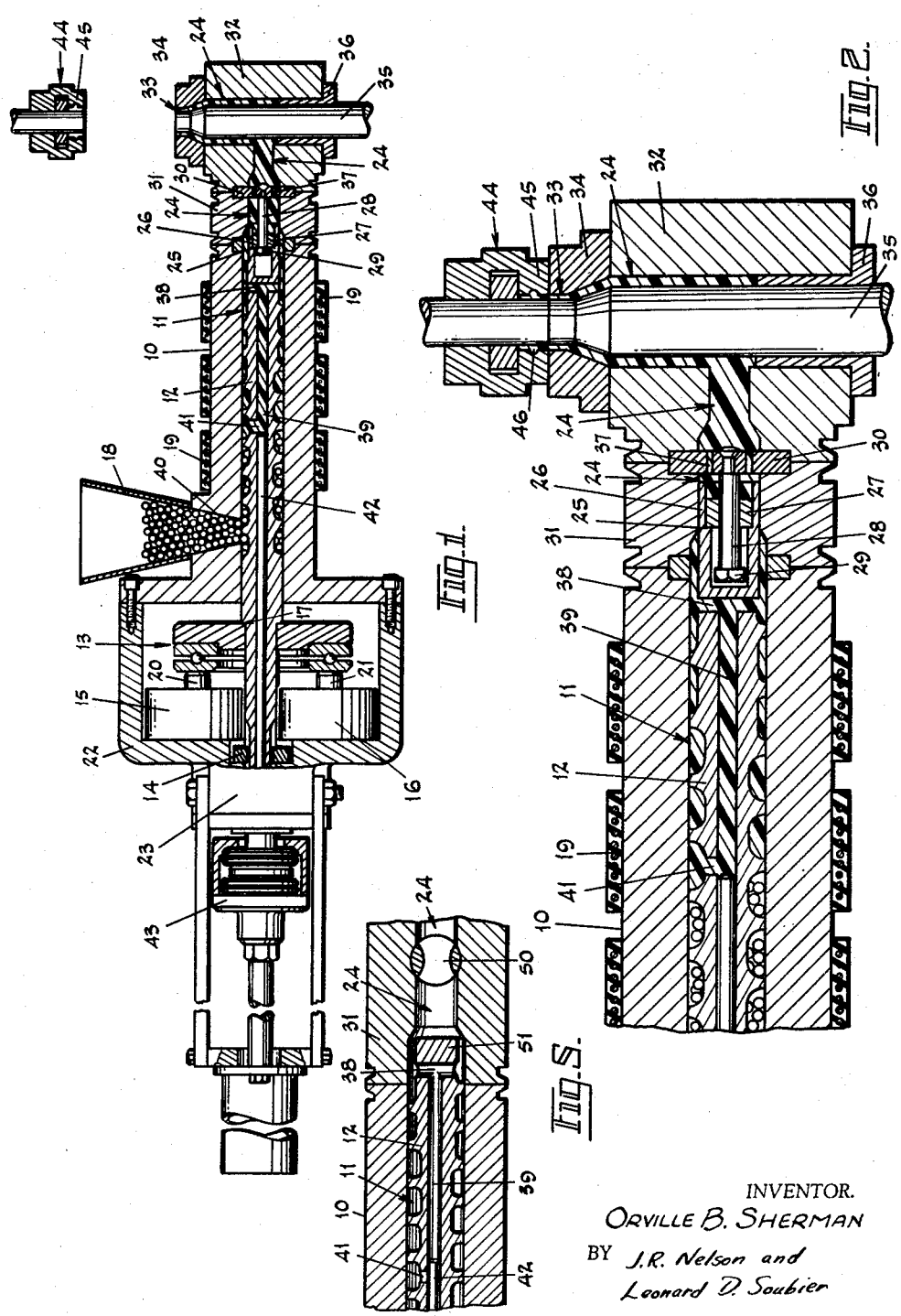

—

United States Patent Office 2,944,288
Patented July 12, 1960

2,944,288

COMBINATION PLASTICIZER, EXTRUDER AND INJECTION CYLINDER WITH RECIRCULATION

Orville B. Sherman, Toledo, Ohio, assignor to Owens-Illinois Glass Company, a corporation of Ohio Filed Jan. 28, 1957, Ser. No. 636,559

17 Claims. (Cl. 18—30)

This invention relates to an improved apparatus for plasticizing, injection molding and extruding thermoplastic materials, as well as the recirculation of the plasticized material through the plasticizer.

Plasticizers have been commonly used in combination with injection cylinders in the plastic molding art, wherein the plasticizer furnishes working material intermittently to a separate injection cylinder and charges of this material are thereupon forced through an orifice into a mold by the powered stroke of an injection ram.

The injection molding operation may be utilized to form a finished article or a finished portion of the article, in which later case the remainder of the article is formed by extruding through the orifice a hollow formation of the material integral with the injection molded portion and then inclosing the extruded formation in a blow mold and expanding it to finish the article.

During the injection molding operation, the plasticizer is stopped and then started again after the injection molding has been completed. Other plasticizers provide for recirculation of the material during this injection molding time by returning the material from a point near the delivery or high pressure end of the plasticizer through a separate and external passage to its material receiving or low pressure end.

It is an object of the present invention to provide a simplified and efficient plasticizer and injection cylinder combined in a single unit.

Another object of the invention is to provide a combination plasticizer and injection cylinder with recirculation of plasticized material through the plasticizer, thereby eliminating need for stop-start operation of the plasticizer.

Another object of the invention is to provide recirculation of plasticized material through an internal passage in the extruder screw of the plasticizer.

Another object of the invention is to provide an injection cylinder utilizing an interior channel of the hollow extruder screw for recirculation of the plasticized material during injection molding.

This invention constitutes an improvement over the invention covered in copending application of applicant and co-inventor G. V. Mumford for "Method and Apparatus for Feeding Plasticized Materials," Serial No. 441,394, filed July 6, 1954, now Patent No. 2,871,516, which earlier filed invention contemplates, generally speaking, a method and apparatus lending itself to plasticizing thermoplastic material and extruding and recirculating said material externally of said plasticizer.

The present invention, on the other hand, contemplates plasticizing a supply of thermoplastic material; then selectively extruding it, recirculating it internally of the plasticizer, injection molding a measured amount of such plasticized material while recirculating the remainder internally of the plasticizer, or sequentially injection molding a pre-measured amount of such plasticized material, while recirculating the remainder of such plasticized material as aforesaid, extruding a predetermined amount of such plasticized material, and finally, recirculating such plasticized material internally of the plasticizer. This invention lends itself to several processes, exemplified by either: injection molding a finished article, injection molding a finished portion of the finished article and extruding a blank portion integral therewith for subsequent finish forming the remainder of the article, or extruding a selected formation, whereupon lengths of this extruded formation are formed into a finished article.

The specific nature of this invention, as well as other objects and advantages thereof, will become apparent to those skilled in the art from the following detailed description, taken in conjunction with the annexed sheets of drawings on which, by way of preferred example only, are illustrated three embodiments of this invention.

In the drawings:

Fig. 1 is a sectional elevational view of the combination plasticizer and injection cylinder of the invention and their actuating mechanism, shown at the start of the injection molding operation.

Fig. 2 is an enlarged fragmentary view, taken from Fig. 1, showing the end of the stroke of the injection piston for the injection molding operation.

Fig. 3 is an enlarged fragmentary view, similar to Fig. 2, showing the apparatus extruding a tubular formation of material integral with the injection molded portion.

Fig. 4 is a sectional elevational view, similar to Fig. 1, but illustrating a modified form of the apparatus.

Fig. 5 is a sectional elevational view of the combination plasticizer and extruder, illustrating a still further modification of the invention.

Generally, the invention consists in combining the extruder screw or plasticizer and injection cylinder into a single compact and efficient unit by mounting the screw in a plasticizing cavity of a main body for rotation and axial movement therein. The rotational displacement of the screw in combination with the conventional heat supplying elements of the main body plasticizes the raw material fed to it and the axial displacement of the screw cooperates with a passage communicating with the cavity to shut-off flow of plasticized material from the screw to the passage, injection mold a quantity of the material in the passage through an orifice, and reopen the passage to receive and/or extrude material delivered by the screw. The apparatus may be utilized to injection mold finished articles by bringing a mold opening in register with the orifice or may be utilized to injection mold a portion of an article and then extrude a formation integral with the injection molded portion for enclosing in a blow mold and expanding it to the finished shape. Also included as a part of the invention is a means of recirculating the plasticized material within the cavity when the passage is shut-off from the screw. This recirculation is accomplished internally of the screw.

Referring to the figures, the invention will now be more particularly described.

In Fig. 1, a main body 10 defines an axial cavity 11 and houses an extruder screw 12 therein. Extruder screw 12 is mounted at its outer end on thrust bearing 13 and is journaled in bearing 14. The outer face of thrust bearing 13 is operatively connected to cylinder piston assemblies 15 and 16 which are hydraulically actuated to shift extruder screw 12 axially inwardly in cavity 11. Piston rods 20 and 21, respectively, bear against the outer face of thrust bearing 13 and are extensible to shift extruder screw 12 inwardly in cavity 11 by the inner face of thrust bearing 13 bearing against annular shoulder 17 of extruder screw 12. A housing 22 connected to main body 10 supports cylinder piston assemblies 15 and 16 and rotary drive assembly 23. Power means (not shown) actuates rotary drive assembly 23 which is operatively connected to the outer end of extruder screw 12 to impart unidirectional rotation to it.

At the top and near the outer end of main body 10 is hopper 18 which receives and contains a supply of thermoplastic raw material, preferably in granulated or pellet form. Hopper 18 communicates with an opening 40 in main body 10 for delivery of raw material to cavity 11. This material is received in cavity 11 and advanced therein by extruder screw 12. As the material is thus advanced it is heated by conventional heater elements 19 of main body 10 and compressed by extruder screw 12 to become plasticized. In so doing, the extruder screw 12 pressurizes the plasticized material as it advances toward the inner end of caivty 11. Accordingly, the inner end portion of cavity 11 and extruder screw 12 (toward the right end in the figures) is herein referred to as the high-pressure end of said cavity and screw and the outer end portion (toward hopper 18 in the figures) is referred to as the low-pressure end of said cavity and screw.

Referring now to Figs. 1-3, it is seen that an injection cylinder barrel 31 abutts main body 10 at the high-pressure end of cavity 11, and a cylindrical passage 24 in cylinder barrel 31 communicates with cavity 11. Passage 24 also extends through orifice head 32 and communicates with orifice 33 formed in orifice bushing 34. Main body 10, injection cylinder barrel 31, orifice head 32 and orifice bushing 34 are integrally connected. Mandrel 35 is inserted axially in a portion of passage 24, terminating in orifice 33, and is held in position by mandrel bushing 36.

The helix on extruder screw 12 terminates near the high-pressure end of screw 12 to form a straight sided cylindrical end portion thereon, and is bored axially to form sleeve 26 provided with an internal annular shoulder 25. A plate member 30 is mounted across passage 24 between injection cylinder barrel 31 and orifice head 32 and supports a fixed axially projecting pin 28. Piston 27 is journaled to float on pin 28 and then inserted into sleeve 26 for limited axial movement therein between the end of sleeve 26 and annular shoulder 25. Piston 27 is retained on pin 28 by its head 29.

When extruder screw 12 is rotating and is shifted to its retracted position (Fig. 3), plasticized material is delivered under pressure to passage 24 and through ports 37 in plate 30, filling said passage with workable material. Piston 27 is held near the open end of sleeve 26 by head 29 of pin 28. By shifting extruder screw 12 inwardly in cavity 11 so that sleeve 26 enters passage 24 (Fig. 1), passage 24 is disconnected from pressurized material in cavity 11. During this movement, piston 27 is held by the material in passage 24 and is thus shifted relative to sleeve 26 until it engages annular shoulder 25 in sleeve 26. Hence, to shut off the flow of plasticized material being delivered by extruder screw 12, only the relatively thin cross sectional area of sleeve 26 need be moved against the pressure head of the material being delivered by the extruder screw 12.

Spaced axially from sleeve 26 in the high-pressure end of extruder screw 12 is a first radially bored passage 38. An axially bored passage 39 extends through the opposite low-pressure end of extruder screw 12 to communicate with radial passage 38. Near the low-pressure of extruder screw 12, but intermediate hopper opening 40 and the high-pressure end of said screw, is a second radially bored passage 41 communicating with axial passage 39. Plunger 42 is inserted in the open end of passage 39 and operatively connected to a reciprocable hydraulic motor assembly 43 mounted outwardly of rotary drive assembly 23. Plunger 42 is reciprocable to either connect or disconnect radial passage 41 and axial passage 39. When plunger 42 is retracted so as to connect passages 41—39, passages 41—39—38 comprise an internal passage through extruder screw 12 for recirculation of plasticized material from the high pressure end of cavity 11 into its low-pressure end. Thus, when extruder screw 12 is shifted to disconnect cavity 11 and passage 24, as is shown in Figs. 1 and 2, plunger 42 is in its retracted position to permit recirculation of pressurized plasticized material through the internal passages 41—39—38 in extruder screw 12.

Meanwhile, injection mold assembly 44 is lowered into register with orifice 33. By shifting extruder screw 12 to its extended position (Fig. 2), piston 27 and sleeve 26 are inserted into passage 24 to operate as an injection molding cylinder. A measured quantity of the plasticized material contained in passage 24 is displaced by this movement of piston 27 and sleeve 26, which material is forced to issue through orifice 33 into mold 45 to form a finish 46 defined by the mold 45.

By shifting extruder screw 12, sleeve 26 and piston 27 to their retracted positoin (Fig. 3), passage 24 and cavity 11 are again connected and extruder screw 12 delivers material to passage 24 and hollow formation 47 is extruded from orifice 33 integral with the molded finish 46. Simultaneously, injection mold assembly 44 is withdrawn in unison with the extrusion of formation 47. Extrusion of formation 47 is stopped at the desired point by again shifting extruder screw 12 into the position shown in Fig. 1, thereby disconnecting passage 24 and cavity 11. Formation 47 may then be enclosed in a blow mold and formed to finished shape by conventional blow molding operations (not shown). Extruded formation 47 may be severed at orifice 33 by passing blade 48 across orifice 33 to clean it for beginning the next injection molding cycle.

The apparatus described may also be applied to only injection molding a finished article, in which case the operating cycle of shifting extruder screw 12 is such that extrusion of formation 47 is eliminated by only connecting passage 24 to cavity 11 sufficiently to replace the previously displaced material in passage 24.

A modification of the invention is illustrated in Fig. 4 which will now be described.

In this second emobdiment of the invention, sleeve 26 and its floating piston 27 on extruder screw 12 are eliminated and the high-pressure end of extruder screw 12 is chamfered at 49 so as to be insertable against the opening of passage 24 and disconnect it from cavity 11. Extruder screw 12 is rotated and reciprocated by the same means as described in Figs. 1-3. The recirculation passage is formed by boring axial passage 39a through the length of extruder screw 12 so that it now communicates with passage 24. A stop-start valve 50 is located in passage 24. Plunger 42 is actuated to be inserted the length of passage 39a and serve as the injection molding piston. The apparatus is started from a setting of valve 50 blocking flow in passage 24. Extruder screw 12 is in its retracted position and plunger 42 is retracted outwardly of radial passage 41 so that it is connected with axial passage 39a. The material delivered by extruder screw 12 at this setting is thus recirculated through passages 39a, 41. After injection mold assembly 44 is brought into register with orifice 33, extruder screw 12 is shifted to engage its chamfer 49 in the opening of passage 24 and disconnect said passage from cavity 11. Valve 50 is opened and plunger 42 is actuated toward the high pressure end of extruder screw 12. The length of travel of plunger 42 in this direction may be adjusted to measure the quantity of material to be injection molded. Material in axial passage 39a is forced into passage 24 by the stroke of plunger 42 and a finished shape is injection molded in mold 45 as previously described.

Where it is desired to blow mold a portion of the finished article integral with the injection molded portion, extruder screw 12 is retracted to connect passage 24 and cavity 11. A tubular formation 47 (Fig. 3) is then extruded and formed, as previously described. After sufficient material is extruded, valve 50 is closed and plunger 42 is retracted to recirculate material through passages 39a—41. The cycle may then be repeated.

Fig. 5 illustrates a further modification of the invention, representing the third embodiment of the invention, in which extruder screw 12 and its internal recirculation passages 38, 39, 41 are the same as previously described for Figs. 1–3, except the sleeve 26 and its floating piston 27 at the high-pressure end of extruder screw 12 are eliminated. Instead, the high-pressure end of extruder screw 12 forms a piston 51 corresponding in diameter to the bore of passage 24 so as to be insertable therein. A stop-start valve 50 is located in passage 24. The apparatus is actuated similar to that previously described for Figs. 1–3. Extruder screw 12 is shifted so that piston 51 is inserted into passage 24 and disconnect said passage from cavity 11. Material delivered by screw 12 is recirculated through its internal recirculation passages 38–39–41. Valve 50 is then opened and extruder screw 12 is shifted to further extend piston 51 into passage 24 and injection mold material to issue from orifice 33 into injection mold 45 (Fig. 2). Extruder screw 12 may then be retracted to extrude an integral formation or valve 50 may be closed to complete the process.

It should be understood, therefore, that all of the described embodiments are readily adaptable to either injection molding finished articles or injection molding a portion of a finished article and then extruding a formation integral therewith adaptable for finish forming the remainder of the article by blow molding techniques. In either case, recirculation of pressurized material is provided internally of the plasticizer whenever delivery of such material is interrupted.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Apparatus for plasticizing thermoplastic material and issuing said material from an orifice comprising a main body having an axial cavity therein adapted to receive raw thermoplastic material from a source thereof, a passage communicating with said cavity and connected to said orifice, an axially shiftable extruder screw rotatably mounted in said cavity and operable for plasticizing said received raw material and delivering said plasticized material to said passage under pressure, said extruder screw having a low-pressure end where raw thermoplastic material is received and a high pressure end where plasticized material is delivered to said passage, power means operable to shift said screw toward said passage and disconnect said passage from said material in said cavity, a piston carried by said screw member and axially shiftable relative to said passage, means accommodating axial movement of said piston relative to said screw and power means actuable to reciprocate said piston relative to said passage, whereby to force measured charges of said plasticized material to issue from said orifice after said screw has disconnected said passage.

2. Apparatus defined in claim 1, wherein the means to disconnect said passage from said pressurized plastized material comprises a hollow sleeve carried axially on the high-pressure end of said screw member, said sleeve being insertable into said passage.

3. Apparatus defined in claim 2, wherein the piston is slidably mounted in said sleeve for limited axial movement relative thereto.

4. Apparatus defined in claim 1, including an axial bore extending through the low-pressure end and to the high-pressure end of said extruder screw, a first radial bore connecting said axial bore with the periphery of said extruder screw near the high-pressure end of said extruder screw, a second radial bore connecting said axial bore with the periphery of said extruder screw near the low-pressure end of said extruder screw, a plunger shiftably mounted in said axial bore and operable to normally disconnect said second radial bore and said axial bore, and means actuable to shift said plunger and connect said second radial bore and said axial bore whenever said passage is disconnected from said cavity, whereby to recirculate said pressurized material within said cavity from the high-pressure end to the low-pressure end of said extruder screw.

5. Apparatus for plasticizing thermoplastic material and issuing measured pressurized charges of said material from an orifice comprising a main body having an axial cavity therein adapted to receive raw thermoplastic material from a source thereof, a passage communicating with said cavity and connected to said orifice, an axially shiftable extruder screw rotatably mounted in said cavity and operable for plasticizing said received raw material and delivering said plasticized material to said passage under pressure, said screw member having a low-pressure end where raw material is received and a high-pressure end where plasticized material is fed into said passage, means operable to disconnect said passage from said cavity, means for recirculating said pressurized material from the high-pressure end of said cavity to the low-pressure end thereof whenever said cavity is disconnected from said passage, a piston carried by said extruder screw and shiftable relative to said passage, lost motion means interconnecting said screw and said piston, and means actuable to shift said screw and said piston, whereby to injection mold measured amounts of said plasticized material through said orifice.

6. Apparatus defined in claim 5, wherein the means to disconnect said passage from said cavity comprises a hollow sleeve mounted axially on the high-pressure end of said extruder screw, said sleeve being insertable into said passage, said means for axially shifting said extruder screw toward said passage shutting off the flow of plasticized material to the passage.

7. Apparatus defined in claim 6, wherein the piston is reciprocably mounted in said sleeve for limited axial movement relative thereto and is shiftable relative to said passage by said means for shifting said extruder screw.

8. Apparatus defined in claim 7, wherein means for recirculating said pressurized material comprises an axial bore in said extruder screw, a first radial bore in said extruder screw connecting the high-pressure end of said cavity with said axial bore, a second radial bore in said extruder screw connecting the low-pressure end of said cavity with said axial bore, a plunger shiftably mounted in said bore and operable to normally disconnect said second radial bore and said axial bore, and power means for shifting said plunger to connect said second radial bore and said axial bore whenever said passage is disconnected from said cavity.

9. Apparatus defined in claim 5, wherein the means to disconnect said passage from said material in said cavity comprises an integral piston on the high-pressure end of said extruder screw, said piston being in register with said passage and insertable therein to sequentially disconnect said passage from said cavity and injection mold through said orifice measured charges from the plasticized material contained in said passage.

10. Apparatus for plasticizing, extruding and injection molding thermoplastic material comprising an extruder main body defining an axial cavity therein and adapted to receive raw thermoplastic material near one end of said cavity, molding means adapted to receive and finally form said material into a finished article, an orifice adapted for operative connection with said means, a passage communicating with the other end of said cavity and connecting it to said orifice, an extruder screw mounted for rotation in said cavity for plasticizing said material received therein and delivering said plasticized material from said cavity to said passage under pressure, said screw being axially shiftable in said cavity to connect and disconnect said passage and said cavity, power means for reciprocating said screw in said cavity, means for recirculating said pressurized material from the material delivery end of said cavity to the material receiving end of said cavity whenever said cavity is disconnected from said passage, and piston means carried by said screw for movement relative thereto and continuously in contact with plasticized material contained in said passage, said piston means being operable in response to said power means for injection molding a measured quantity of plasticized material through said orifice whenever said passage is disconnected from said cavity by movement of said screw.

11. Apparatus for plasticizing, extruding and injection molding thermoplastic material in a mold comprising an extruder main body defining an axial cavity therein adapted to receive raw thermoplastic material near one end of said cavity, molding means adapted to receive and finally form said material in to a finished article, an orifice adapted for operative connection with said means, a passage communicating with the other end of said cavity and connecting it to said orifice, an extruder screw mounted for rotation in said cavity for plasticizing said material received therein and delivering said plasticized material to said passage under pressure, said screw being axially shiftable in said cavity, a hollow sleeve integral with the end of said screw and insertable into said passage to disconnect said passage and said cavity, a piston slidably mounted in said sleeve for limited axial movement relative thereto, power means for reciprocating said screw and said piston, whereby to alternatively either disconnect said passage and said cavity and injection mold a measured quantity of plasticized material displaced through said orifice by said piston or connect said passage and said cavity for extrusion of said material from said orifice.

12. Apparatus for plasticizing thermoplastic material and issuing said material from an orifice comprising a main body having an axial cavity therein adapted to receive raw thermoplastic material from a source thereof, a passage communicating with said cavity and connected to said orifice, an axially shiftable extruder screw rotatably mounted in said cavity and operable for plasticizing said received raw material and delivering said plasticized material to said passage under pressure, said extruder screw having a low pressure end where raw thermoplastic material is received and a high pressure end where plasticized material is delivered to said passage, power means operable to shift said screw toward said passage and disconnect it from said material in said cavity, an axial bore extending through both ends of said extruder screw member and communicating with said passage, a piston in said axial bore of said extruder screw member adapted for axial reciprocating movement relative to said passage, a first radial bore connecting said axial bore and the periphery of said extruder screw near the high pressure end thereof, a second radial bore connecting said axial bore and the periphery of said extruder screw near the low pressure end thereof, and means actuable to reciprocate said piston responsive to the axial position of the extruder screw, said piston being retracted to connect said second radial bore and said axial bore whenever said passage is disconnected from said cavity to permit recirculation of said pressurized material within said cavity from the high pressure end of the extruder screw to the low pressure end thereof and said piston being operable to extend longitudinally along said axial bore and injection mold material in said passage through said orifice.

13. The method of making a plastic article from solid thermoplasitc material comprising the steps of plasticizing said thermoplastic material in a plasticizing chamber to a fluid state and advancing said material toward an injection mold, extruding plasticized material from said chamber into a passage communicating with said injection mold, segregating material in said passage from said plasticizing chamber, thereby concurrently isolating plasticized material in said chamber subjecting said segregated material to an injection pressure to fill said injection mold, reestablishing communication between said plasticizing chamber and said passage, extruding from said passage a portion of material integral with that filling said injection mold, again segregating material in said passage from said plasticizing chamber, thereby again isolating plasticized material in said chamber and recirculating fluid material in said plasticizing chamber to accommodate the continued advancement of material in said chamber during those periods at which material in said passage is segregated from said chamber and plasticized material is isolated in said chamber.

14. In an apparatus for plasticizing, extruding and injection molding thermoplastic material, an extruder main body defining an axial cavity therein adapted to receive raw thermoplastic material near one end of said cavity, molding means adapted to receive and finally form said material into a finished article, an orifice adapted for operative connection with said means, an orifice passage communicating with the other end of said cavity and connecting it to said orifice, an extruder screw mounted for rotation on said cavity for plasticizing said material received therein and for supplying said plasticized material to said orifice passage under pressure, said extruder screw plasticizing said raw material to a fluid state at a medial point of said axial cavity, valve means interposed between said cavity and said orifice and operable to connect said cavity to said orifice for supplying said material thereto and to disconnect said cavity and said orifice, means defining a recirculation passage communicating with said other end of said cavity and with said medial point of said cavity, said recirculation passage cooperating with said cavity to define a closed circulatory path for plasticized material supplied by said screw, a piston slidably disposed in said recirculation passage to control the flow of plasticized material therein and to inject material therefrom into said orifice passage, and power means for actuating said piston toward said orifice passage to inject material, said piston being retractable away from said orifice pasasge after the injection of material to accommodate recirculation of material through said closed circulatory path when said valve means disconnects said cavity and said orifice.

15. In an apparatus as defined in claim 14, the combination wherein said recirculation passage includes an axial bore in said extrusion screw communicating with both ends thereof, a radial passage communicating with the bore and the medial portion of said screw, and the piston extends axially of the bore for extension toward the screw discharge end to inject material from the bore and for retraction to uncover the radial passage to accommodate recirculation.

16. In a method of making a number of successive individual plastic articles from solid plastic material supplied to a housing to be advanced therethrough by a continuously rotating extruder screw at a normal extruder output pressure, the exit end of the screw communicating with an orifice, the solid material being rendered fluid during its passage intermediate the housing and the exterior periphery of the screw therein, the steps of interrupting communication between the screw exit end and the orifice intermediate the forming of successive articles, accumulating that material supplied by the screw during such interruption, venting excess accumulated material to that exterior peripheral portion of the screw at which the material in the housing is fluid, thereby recirculating a portion of the accumulated material, simultaneously interrupting the venting of the accumulated material and issuing through the orifice the accumulated plasticized material at a pressure from a source other than the screw.

17. In a method of making a number of successive individual plastic articles from solid plastic material supplied to a housing to be advanced therethrough by a continuously rotating extruder screw at a normal extruder output pressure, the exit end of the screw communicating with an orifice, the solid material being rendered fluid during its passage intermediate the housing and the exterior periphery of the screw therein, the steps of interrupting communication between the screw exit end and the orifice intermediate the forming of successive articles, accumulating that material supplied by the screw during such interruption, venting excess accumulated material to that exterior peripheral portion of the screw at which the material in the housing is fluid, thereby recirculating a portion of the accumulated material, simultaneously interrupting the venting of the accumulated material and issuing through the orifice the accumulated plasticized material during interruption of communication between the screw exit end and the orifice, reestablishing communication between the screw exit end and the orifice, and issuing plastic material through the orifice from the screw.

References Cited in the file of this patent

UNITED STATES PATENTS

| | | |
|---|---|---|
| 2,175,054 | Ferngren et al. | Oct. 3, 1939 |
| 2,288,454 | Hobson | June 30, 1942 |
| 2,629,132 | Willcox et al. | Feb. 24, 1953 |
| 2,680,880 | Corbett | June 15, 1954 |
| 2,848,739 | Henning | Aug. 26, 1958 |

FOREIGN PATENTS

| | | |
|---|---|---|
| 234,156 | Great Britain | May 22, 1925 |